US012685267B2

(12) United States Patent
Jin et al.

(10) Patent No.: US 12,685,267 B2
(45) Date of Patent: Jul. 21, 2026

(54) UNLOAD TUBE FOR AGRICULTURAL VEHICLE

(71) Applicant: CNH Industrial America LLC, New Holland, PA (US)

(72) Inventors: Jishan Jin, Naperville, IL (US); Denver Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 524 days.

(21) Appl. No.: 18/140,016

(22) Filed: Apr. 27, 2023

(65) Prior Publication Data

US 2024/0357969 A1 Oct. 31, 2024

(51) Int. Cl.
*A01D 90/10* (2006.01)

(52) U.S. Cl.
CPC ................................... *A01D 90/10* (2013.01)

(58) Field of Classification Search
CPC ......... A01F 12/46; A01D 90/10; A01D 90/12; A01D 41/1217
See application file for complete search history.

(56) References Cited

U.S. PATENT DOCUMENTS

| | | | | |
|---|---|---|---|---|
| 3,093,254 A | * | 6/1963 | Sammarco | B60P 1/36 |
| | | | | 220/4.12 |
| 4,016,710 A | | 4/1977 | May et al. | |
| 6,669,240 B1 | | 12/2003 | Signer et al. | |

| | | | | |
|---|---|---|---|---|
| 7,644,816 B2 | | 1/2010 | Veiga Leal et al. | |
| 11,445,664 B2 | | 9/2022 | Campen et al. | |
| 2008/0092504 A1 | * | 4/2008 | Voss | A01D 41/1217 |
| | | | | 56/16.6 |
| 2011/0094199 A1 | * | 4/2011 | Farley | A01F 12/46 |
| | | | | 56/14.6 |
| 2015/0156968 A1 | | 6/2015 | Lauwers et al. | |
| 2020/0352104 A1 | * | 11/2020 | Campen | B65G 33/14 |

FOREIGN PATENT DOCUMENTS

| | | | | | |
|---|---|---|---|---|---|
| CA | 3008122 A1 | * | 12/2018 | ............ | F16H 1/222 |
| CN | 209399041 U | | 9/2019 | | |
| EP | 1186222 B1 | | 1/2005 | | |
| GB | 1210044 A | | 10/1970 | | |
| KR | 20160014526 A | * | 2/2016 | ............ | A01F 12/46 |
| WO | 2021144631 A1 | | 7/2021 | | |

OTHER PUBLICATIONS

U.S. Appl. No. 18/081,280, filed Dec. 14, 2022, 26 pages.
The Extended European Search Report issued Oct. 14, 2024, by the European Patent Office in corresponding European Patent Application No. 24 171 759.4-1105. (9 pages).

* cited by examiner

*Primary Examiner* — Joseph M Rocca
*Assistant Examiner* — Douglas J Meislahn
(74) *Attorney, Agent, or Firm* — Buchanan Ingersoll & Rooney PC

(57) ABSTRACT

An unload tube assembly for an agricultural vehicle includes an inner tube defining a proximal end and a distal end, an outer tube extending about the inner tube, a flange disposed at the proximal end of the inner tube, and a gusset that is connected to the flange and the inner tube for supporting a weight of the unload tube assembly.

14 Claims, 5 Drawing Sheets

UNLOAD TUBE FOR AGRICULTURAL VEHICLE

FIELD OF THE INVENTION

The present invention relates to agricultural vehicles, such as combine harvesters. More specifically, the present invention relates to a reinforced unload tube for an agricultural vehicle.

BACKGROUND OF THE INVENTION

As is described in U.S. Patent App. Pub. No. 2015/0156968 to CNH America LLC (the '968 Pub.) as well as U.S. patent application Ser. No. 18/081,280 to CNH America LLC, which are each incorporated by reference in their entirety and for all purposes, a combine harvester is a type of agricultural vehicle that is used to harvest grain crops.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the material other than grain ("MOG") through the action of the drum against the concaves that may also be fitted with steel bars and a meshed grill, through which grain, chaff and smaller debris may fall, whereas the straw, being too big or long, is carried through to the outlet. The chaff, straw, and other undesired material (i.e., MOG) are returned to the field via a spreader mechanism.

The threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located in an upper portion of the combine and loaded via a conveyer that carries clean grain collected in the cleaning system to the grain tank.

Conventional unload systems include grain tanks arranged such that grain conveyed from the cleaning system fills the tanks and is gravity-fed into one or more cross augers. By virtue of gravity feed and the cross augers, grain may be distributed to one or more areas in the grain tank, such that another conveying system can unload the grain from the grain tank. Because the typical grain tank is small compared to the size of the harvest, grain that collects temporarily in the grain tank may, in some harvests, be conveyed or unloaded via an unload tube to a support trailer, truck, or grain cart alongside the combine.

The unload tube, which has considerable length and weight, is pivotably mounted to the grain tank. Described herein is a system for reinforcing the unload tube in an effort to support its considerable weight.

SUMMARY OF THE INVENTION

According to one aspect of the invention, an unload tube assembly for an agricultural vehicle includes an inner tube defining a proximal end and a distal end, an outer tube extending about the inner tube, a flange disposed at the proximal end of the inner tube, and a gusset that is connected to the flange and the inner tube for supporting a weight of the unload tube assembly.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
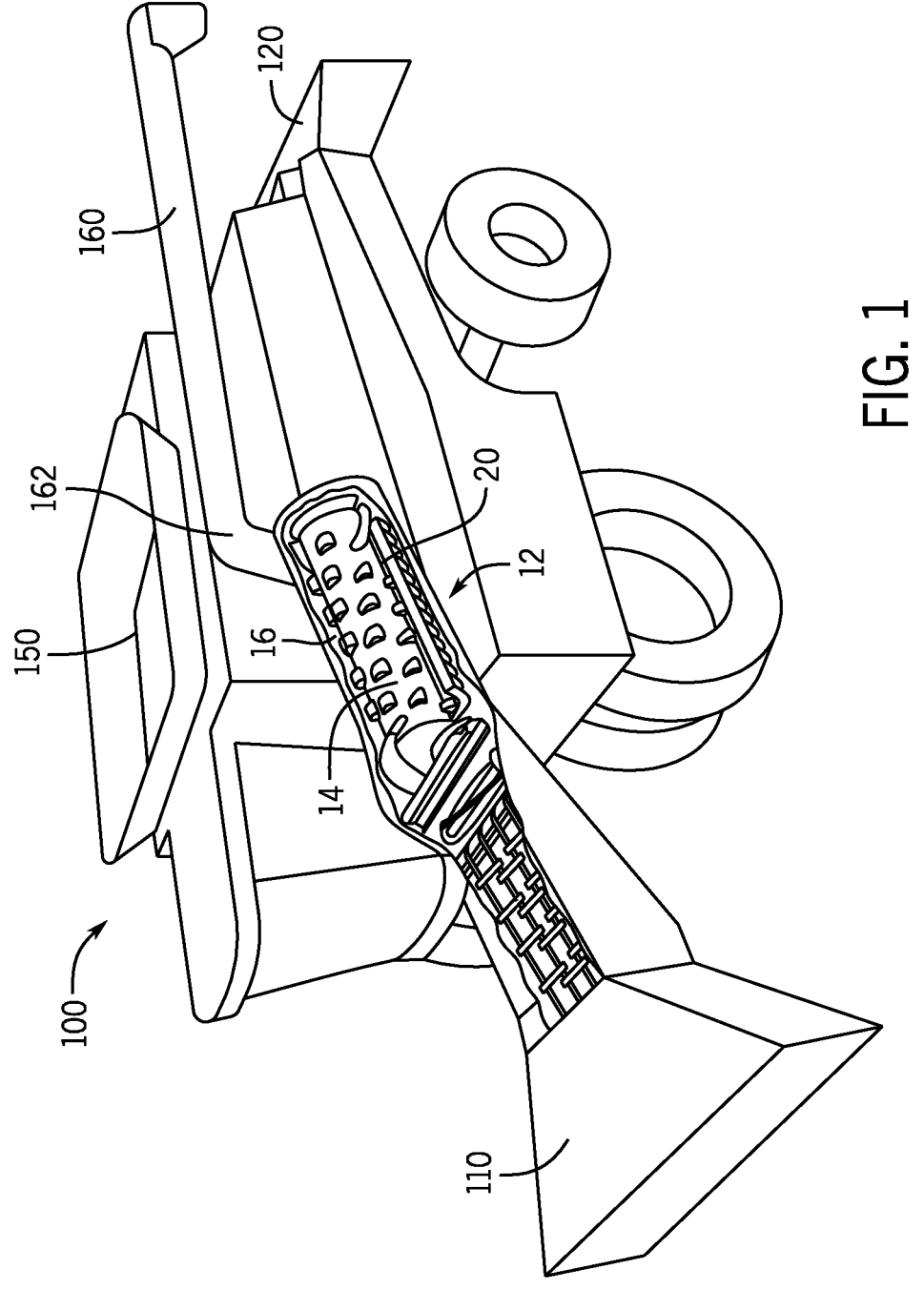
FIG. 1 illustrates a perspective view of an exemplary combine for use with embodiments described herein.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

Figure 2:
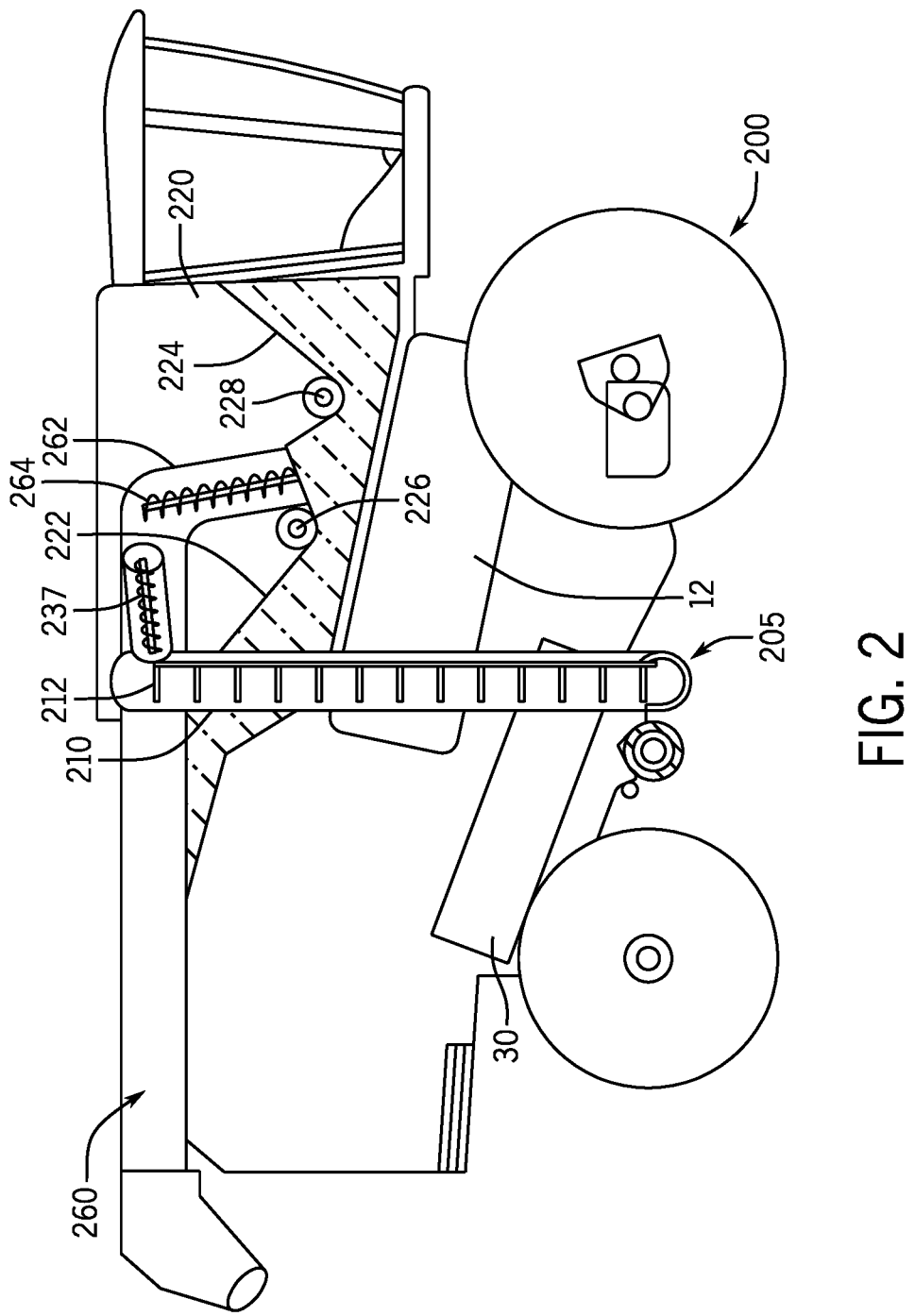
FIG. 2 illustrates a side view of another exemplary combine for use with embodiments described herein.

As is described in the '968 Pub., FIGS. 1 and 2 show exemplary agricultural combines in which exemplary embodiments described herein may be implemented. FIG. 1 shows an exemplary agricultural combine 100, which may also be referred as a combine or harvester throughout this specification. As shown in FIG. 1, the combine 100 can include header 110, a longitudinally axially arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concave 20 may extend circumferentially around the rotor 14 and the flow of crop may pass in the space between the spinning rotor and the concaves. As the crop material flows through the threshing and separation system 12, the crop material will be loosened and separated from crop residue or MOG, and the separated materials may be carried away from the threshing and separation system 12 in a well-known conventional manner. Crop residue can be redistributed to the field via a spreader 120, located at, for example, the back of the harvester.

The remaining threshed crop, which includes the grain to be collected, is then cleaned via a cleaning system. The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160. Unload tube 160 represents a turret style system of offloading. Vertical tube 162 may include a single unload conveying auger or multiple unload conveying augers, such as an auger for propelling grain up and to another horizontal auger that is located within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown.

FIG. 2 shows a transparent cross-sectional view of an exemplary agricultural combine 200. Many of the details in connection with combine 100 apply to combine 200, and only the differences therebetween are described below.

Combine 200 includes a grain tank 220 with multiple cross augers 226 and 228. Crop is threshed via threshing system 12. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210 which includes a paddle chain lift 212. The paddle chain lift 212 conveys the grain upward to a dispenser auger 237 that discharges the grain into the grain tank 220. In this arrangement of grain tank 220, sloping side walls 222 and 224 are sloped such that as grain accumulates in the grain tank 220 as conveyed from dispenser auger 237, the grain naturally slides down to cross augers 226 and 228. Grain tank cross augers 226 and 228 convey the accumulated grain laterally so that it may be collected into vertical tube 262 which includes an unload conveying vertical auger 264 that propels the grain upward. This allows grain to be moved into an unload vehicle via unload tube 260, which includes another unload conveying internal auger (not shown) that rotates about a pivot coextensive with vertical tube 262.

Figure 3:
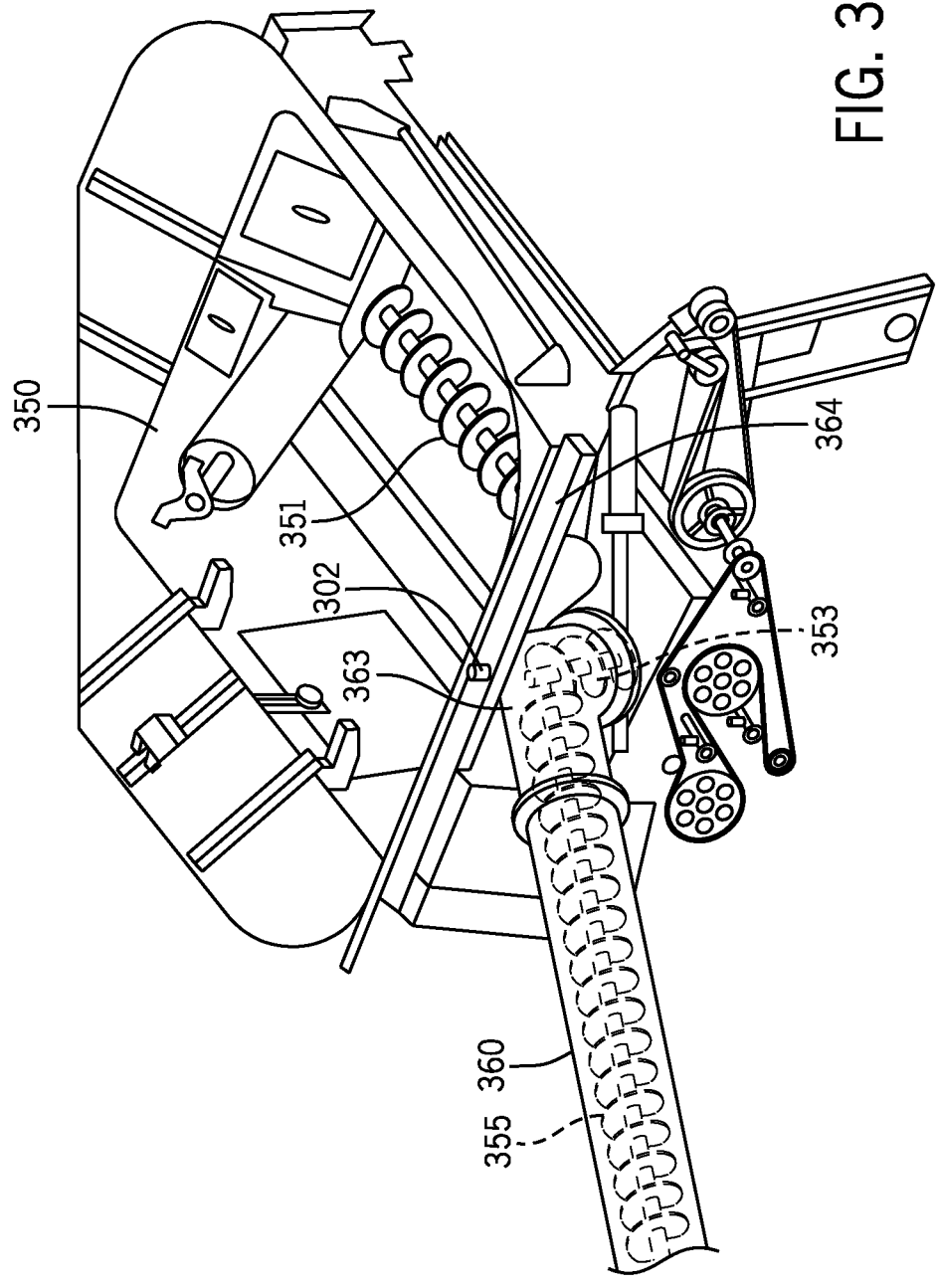
FIG. 3 is an isometric view, as viewed from the top, of a grain tank assembly of yet another combine and for use with embodiments described herein.

FIG. 3 depicts an isometric view of a sub-assembly of yet another combine. The above described details of combines 100 and 200 apply to the combine sub-assembly of FIG. 3, unless otherwise noted.

The combine sub-assembly of FIG. 3 generally includes a grain tank 350, which is mounted to a structural frame of the combine. A cross-auger 351 is mounted at the bottom of tank 350 for supplying grain to unload tube 360. Unload tube 360 includes a vertical unload auger 353 for receiving grain from cross-auger 351 and delivering the grain to a swing auger 355. Both augers 353 and 355 are positioned within the hollow interior of tube 360. The swing auger 355 rotates around an axis of the vertical auger 353 between a transport and an unload position. Unload tube 360 includes a ninety-degree tubular elbow casting 363 that houses at least a portion of the augers 353 and 355. Elbow 363 may or may not be considered as forming a port of unload tube 360. A pivot pin 302 is disposed at the top of elbow 363. Pin 302 passes through frame member 364 of grain tank 350. Tube 360 may be rotatably suspended from frame member 364 by pin 302.

As noted above, the unload tubes 160, 260 and 360, which are mounted either directly or indirectly to the respective grain tanks, have considerable length and weight and are pivotably mounted to the grain tank. Each unload tube pivots between a transport position (adjacent the grain tank) and an unload position in which the unload tube is pivoted away from the grain tank to transfer clean grain to a support trailer, truck, or grain cart that is positioned alongside the combine. Unload tube systems may be subject to unload tube sag due to various reasons such as weight, loading, bushing wear, clamp joint slip, and system component deflection.

Figures 4, 5:
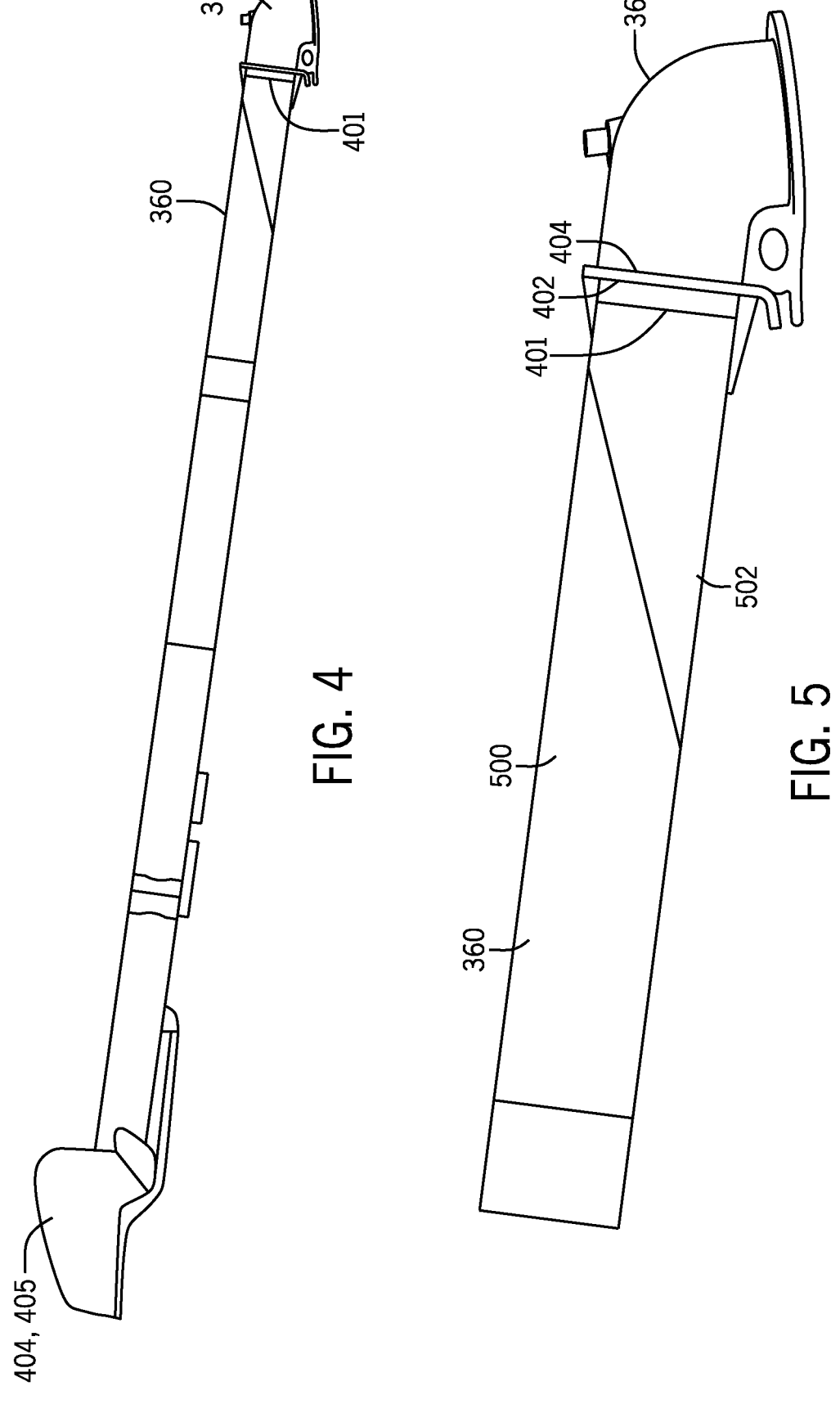
FIG. 4 is an isometric view of the entire unload tube of FIG. 3.
FIG. 5 is an isometric view of a portion of the unload tube of FIG. 4
Figure 6:
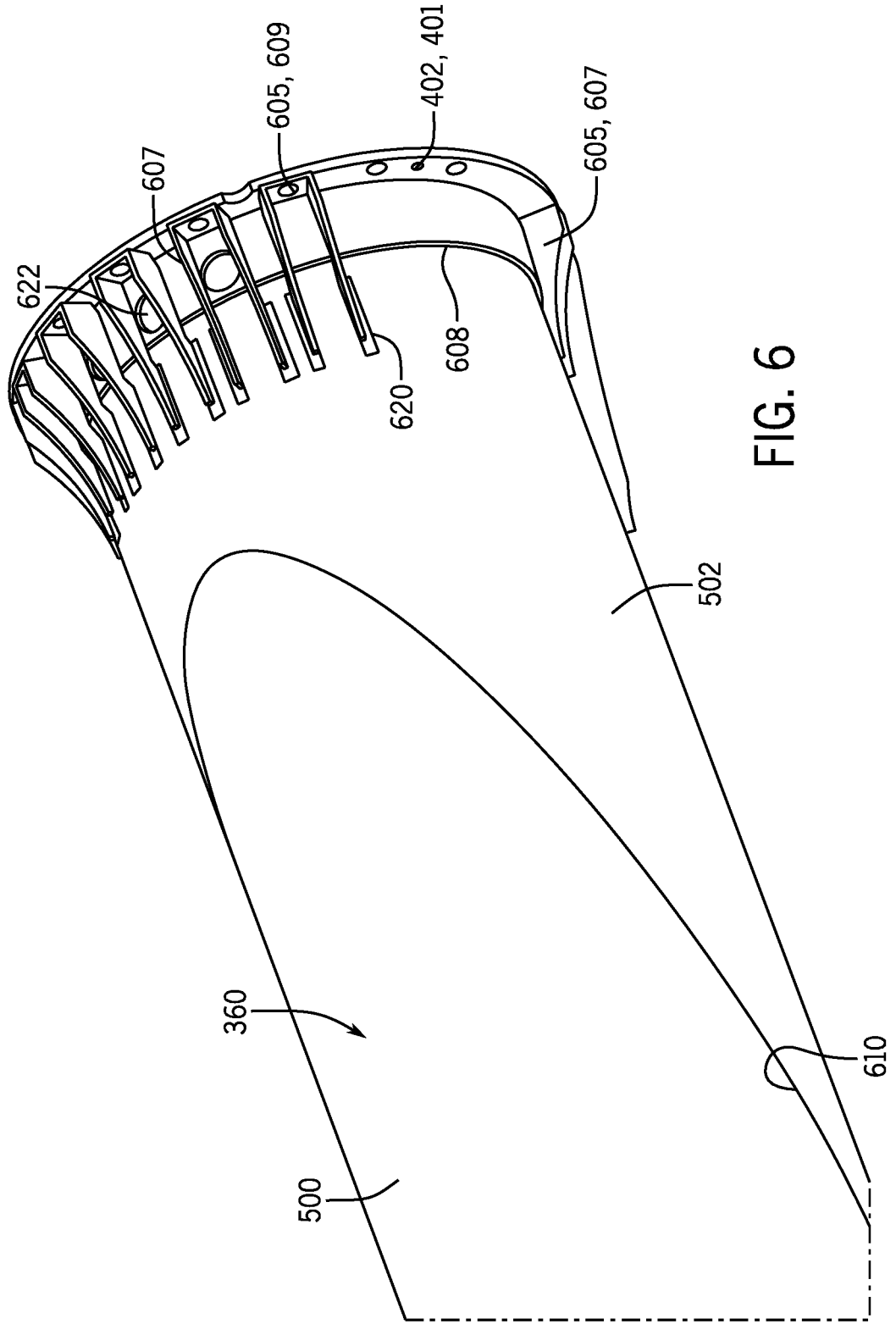
FIG. 6 is an isometric view of a portion of the partial unload tube of FIG. 5.

Unload tube 360 has been reinforced, as compared with prior art unload tubes, in an effort to support its considerable weight. Turning now to FIGS. 4-6, both unload tube 360 and elbow 363 are shown. Unload tube 360 defines (i) a proximal end 401 including an annular flange 402 that is mounted to a mating annular flange 404 of the elbow 363, and (ii) a distal end covered by a pivotable boot 405 through which grain is expelled from tube 360.

Unload tube 360 is an assembly including an inner tube 500, an outer tube 502 that surrounds at least a portion of the inner tube 500, a flange 402 that is connected to the proximal end 401 of the inner tube 500, and a plurality of gussets 605 (seven shown) that are mounted to both flange 402 and inner tube 500. The flange 402 includes an axially extending portion and a radially extending portion. The axially extending portion may be fixed (e.g., welded, bolted, etc.) to inner tube 500 and/or outer tube 502. Unless noted hereinafter, all components of tube 360 may be cylindrical and hollow.

Outer tube 502 may be fixed (e.g., welded, plug welded, bolted, etc.) to inner tube 500 at various locations. Outer tube 502 has a planar proximal end 608 that abuts the flange 402 and a distal end 610 that is slanted, tapered, cut, or sloped end (as shown) in the distal direction. The taper runs oblique to the longitudinal axis of tube 360. One reason for tapering the end of outer tube 502 is to reduce weight while supporting the bottom side of inner tube 610. The outer tube 502 covers a greater area on the bottom side of inner tube 610 (which may be subject to bowing) than the top side of inner tube 610. Outer tube 502 structurally supports inner tube 500 and either prevents or limits bowing (or other deformation) of inner tube 500 when loaded with grain. When loaded with grain, inner tube 500 could bow to a slight degree under weight load, thereby contacting outer tube 502 and transferring the weight load to the outer tube 502, which will prevent or limit further bowing of inner tube 500.

Inner tube 500 may have a greater wall thickness than outer tube 502. In the absence of outer tube 502, inner tube 500, which extends the entire length of unload tube 360, would require a greater wall thickness to support the load of the grain. Increasing the wall thickness of the inner tube 500 would lead to a further increase in tube weight. Thus, adding a relatively shorter outer tube 502 over inner tube 500 enhances the structural integrity of unload tube 360 while minimizing the weight of tube 360. It is noted that inner and outer tubes are not limited to being cylindrical, and may take any shape or form.

Gussets 605 are positioned either uniformly or non-uniformly (as shown) about the circumference of flange 402 to assist in carrying the weight of unload tube 360 at the interface between the tube 360 and the elbow 363. Gussets 605 transfer the weight of tube 360 to flange 402, which transfers that weight to elbow 363, which transfers that weight to frame member 364 (FIG. 3) of the combine grain tank 350.

Gussets 605 may be positioned at the top half (or side) and bottom half (or side) of flange 402. Each gusset 605 includes two ramp-shaped or triangular legs 607 that are arranged in parallel, and a connecting portion 609 extending between and interconnecting the two legs 607. Portion 609 is connected (e.g., bolted, welded, fastened, etc.) to the radially extending portion of flange 402. Portion 609 includes an opening that registers with an opening in flange 402. In assembled form, for each gusset 605, a bolt (not shown) may be positioned through the registered openings in portion 609 and flange 402 for fastening gusset 605 to flange 402. Each leg 607 passes through a rectangular shaped opening 620 formed in outer tube 502 and is connected to the exterior surface of inner tube 500 by a weld (for example). The openings 620 are formed on the top side and the bottom side of the outer tube 502.

Openings 622 are disposed on the axially extending portion of flange 402 at a location between the legs of each gusset 605. Openings 622 may be used, for example, for welding flange 402 to inner tube 500.

Further details in connection with unload tube 360 are provided in U.S. Pat. No. 7,644,816, which is incorporated by reference in its entirety.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An unload tube assembly of an agricultural vehicle, the unload tube assembly comprising:
   an inner tube defining a proximal end and a distal end;
   an outer tube extending about the inner tube;
   a flange disposed at the proximal end of the inner tube, the flange connected to a component of the agricultural vehicle through which crop material is delivered; and
   a gusset that is connected to the flange and the inner tube for supporting a weight of the unload tube assembly,
   wherein the outer tube includes one or more openings, and a portion of the gusset extends through the opening for connection to the inner tube.

2. The unload tube assembly of claim 1, wherein the outer tube is welded or otherwise fixed to the inner tube at one or more locations.

3. The unload tube assembly of claim 1, wherein the flange is welded or otherwise fixed to the inner tube.

4. The unload tube assembly of claim 1, wherein the component of the agricultural vehicle is an elbow having an elbow flange mated with the flange.

5. The unload tube assembly of claim 1, wherein the inner tube has a different wall thickness than the outer tube.

6. The unload tube assembly of claim 5, wherein the inner tube has a greater wall thickness than the outer tube.

7. The unload tube assembly of claim 1, further comprising a plurality of the gussets arranged about a perimeter of the unload tube assembly.

8. The unload tube assembly of claim 7, wherein the plurality of gussets are non-uniformly arranged about the perimeter of the unload tube assembly, and are isolated on top and bottom halves of the unload tube assembly.

9. The unload tube assembly of claim 1, wherein the gusset includes a connecting portion connected to the flange, and two legs depending from the connecting portion, wherein each leg is mounted to the inner tube.

10. The unload tube assembly of claim 9, wherein the legs are welded or otherwise fixed to the inner tube.

11. The unload tube assembly of claim 1, wherein the outer tube has a proximal end and an entirety of the proximal end abuts the flange, and the outer tube has a distal end that is tapered such that the distal end extends non-uniformly along a length of the inner tube.

12. The unload tube assembly of claim 1, wherein a bottom end of the outer tube extends a greater distance over a length of the inner tube than does a top end of the outer tube.

13. An agricultural vehicle comprising the unload tube assembly of claim 1, wherein the unload tube assembly is moveably mounted to a grain tank of the agricultural vehicle between a deployed position and a stowed position.

14. The agricultural vehicle of claim 13, wherein the agricultural vehicle is a combine harvester.

* * * * *